United States Patent [19]

Lau

[11] Patent Number: 5,418,538
[45] Date of Patent: May 23, 1995

[54] RAPID SATELLITE SIGNAL ACQUISITION IN A SATELLITE POSITIONING SYSTEM

[75] Inventor: Chung Lau, Sunnyvale, Calif.

[73] Assignee: Trimble Navigation Limited, Sunnyvale, Calif.

[21] Appl. No.: 65,839

[22] Filed: May 21, 1993

[51] Int. Cl.$^6$ .................... G01S 5/02; H04B 15/00
[52] U.S. Cl. .................... 342/357; 342/358; 371/1
[58] Field of Search ............ 342/357, 358; 375/1

[56] References Cited

U.S. PATENT DOCUMENTS

| | | | |
|---|---|---|---|
| 4,384,293 | 5/1983 | Deem et al. | |
| 4,463,357 | 7/1984 | Mac Doran | |
| 4,701,934 | 10/1987 | Jasper | 342/357 |
| 4,751,512 | 6/1988 | Longaker | 342/357 |
| 4,968,981 | 11/1990 | Sekine et al. | |
| 5,021,792 | 6/1991 | Hwang | |
| 5,036,329 | 7/1991 | Ando | |
| 5,059,969 | 10/1991 | Sakaguchi et al. | |
| 5,061,936 | 10/1991 | Suzuki | |
| 5,101,356 | 3/1992 | Timothy et al. | |
| 5,119,102 | 6/1992 | Barnard | 342/357 |
| 5,119,504 | 6/1992 | Durboraw | |
| 5,146,231 | 9/1992 | Ghaem et al. | |
| 5,155,491 | 10/1992 | Ando | |
| 5,185,761 | 2/1993 | Kawasaki | 342/357 |
| 5,225,842 | 7/1993 | Brown et al. | 342/357 |

Primary Examiner—Gregory C. Issing
Attorney, Agent, or Firm—John Schipper

[57] ABSTRACT

A method for fast acquisition of Satellite Positioning System (SATPS) signals from a satellite-based positioning system, such as GPS or GLONASS, that does not require permanent storage of satellite almanac information at an SATPS ground station. This SATPS signal acquisition method can be used whenever the "new" station initially powers up or has lost lock on one or more SATPS signals that must be reacquired. A nearby reference SATPS station, whose location coordinates are known with high accuracy, provides the new SATPS station with differential positioning SATPS information, and, optionally, with SATPS satellite ephemeride information on each SATPS satellite visible from the reference station. The new station then uses this differential SATPS information to establish channels to search for (only) the SATPS satellites that are visible from the reference station. By limiting the search to the frequency range and code-phase attributes, such as the distinctive pseudo-random noise code used by each SATPS satellite, corresponding to these visible SATPS satellites, the ranges to be searched are decreased. When a first SATPS satellite signal is acquired and locked onto by the new station, the frequency range for searching is narrowed to a range corresponding to the Doppler shift frequency range for the visible satellites, and acquisition of additional SATPS satellite signals proceeds quickly. This system also allows the use of less accurate timing sources for the new stations. A new station need not store the ephemeride information for the SATPS satellites but may call upon and use the ephemeride information stored at the reference station.

6 Claims, 2 Drawing Sheets

RAPID SATELLITE SIGNAL ACQUISITION IN A SATELLITE POSITIONING SYSTEM

BACKGROUND OF THE INVENTION

When a Satellite Positioning System (SATPS) receiver/processor powers up, or when the receiver/processor experiences SATPS signal interruption, if the receiver/processor has no almanac that indicates the present location of the visible SATPS satellites, the receiver/processor and associated SATPS antenna will perform a blind satellite search to find a sufficient number of SATPS satellites, usually three or more, to begin establishing the antenna's SATPS determined location and/or proper time. The SATPS antenna and receiver/processor will usually select SATPS satellite numbers at random for the search. This procedure will often consume several minutes before "lock" on an adequate number of SATPS satellite signals is achieved. Several workers in electrical communications have disclosed methods and/or apparati for reducing the time or difficulty of acquiring signals communicated from satellites.

U.S. Pat. No. 4,384,293, issued to Deem et al, discloses apparatus for providing pointing information, using one or more GPS satellites and two antennas spaced apart about ten carder signal wavelengths. The difference in phase of GPS signals received by the two antennas determines the pointing direction determined by the line of sight between the two antennas. Phase differences of GPS signals received by arrays of three or more collinear or non-collinear antennas are used to determine the attitude of an object on which the antennas are mounted in U.S. Pat. No. 5,021,792, issued to Hwang, and in U.S. Pat. No. 5,101,356, issued to Timothy et al.

Sekine discloses GPS receiver/processor apparatus that quickly maximizes correlation between a received GPS pseudo-random noise (PRN) code and an internally stored GPS code, in U.S. Pat. No. 4,968,981. This approach uses a separate channel for each of N PRN codes and shifts the phase of the internally stored code n/2 bits at a time (n=1, 2, ..., N), in a search for a position of increased code correlation value.

In U.S. Pat. No. 5,036,329, Ando discloses a satellite reacquisition or initial acquisition method applicable to GPS satellites. Using an estimate of the average Doppler shifted frequency $f_{avg}$ manifested by the GPS signals received from a visible GPS satellite, a narrow band search is first performed in the frequency range $f_{avg} - 8600$ Hz $\leq f \leq f_{avg} + 8600$ Hz. If no GPS satellite signals are found in this range within 3.75 minutes, the search range is widened until at least one GPS satellite signal is found.

A simultaneous multi-channel search for reacquisition of GPS satellite signals after signal interruption occurs is disclosed by Sakaguchi and Ando in U.S. Pat. No. 5,059,969. This method first searches for the GPS satellite with the highest elevation angle relative to the GPS antenna. Two or more sequences of signal frequency ranges are swept over in parallel until at least one GPS signal is reacquired.

U.S. Pat. No. 5,061,936, issued to Suzuki, discloses attitude control for a rotationally mobile antenna. If the strength of the initial signal received by the antenna from a spacecraft (whose position is yet unknown) is below a first selected threshold and above a second selected threshold, the antenna attitude is scanned over a relatively small range, to increase the signal strength toward or above the first threshold value. If the signal strength is initially below the second threshold, the antenna attitude is scanned over a larger range, to increase the signal strength above the second threshold value so that a smaller range antenna scan can be implemented.

In U.S. Pat. No. 5,119,504, Durboraw discloses a satellite-aided cellular communications system in which a subscriber unit self-determines its own (changing) location and transmits this information to the satellites for use in subsequent communications. This requires that each subscriber unit transmit and receive signals, and one subscriber unit does not communicate directly with, or provide satellite location information for, another subscriber unit.

An electronic direction finder that avoids reliance on sensing of terrestrial magnetic fields for establishing a preferred direction for satellite signal acquisition is disclosed by Ghaem et al in U.S. Pat. No. 5,146,231. The apparatus uses a receiver/processor for GPS or similar navigation signals received from a satellite, and requires (stored) knowledge of the present location of at least one reference satellite from which signals are received. The orientation of the finder or its housing relative to a line of sight vector from the finder to this reference satellite is determined. This orientation is visually displayed as a projection on a horizontal plane. Any other direction in this horizontal plane can then be determined with reference to this projection from a knowledge of the reference satellite location.

Ando, in U.S. Pat. No. 5,155,491, discloses a method for tracking radio signals from GPS satellites that follow a single orbit around the Earth. At most four GPS satellites follow one of the six GPS orbits, as the constellation is presently configured. The C/A-code and/or P-code is known for each of the at-most-four GPS satellites in a single orbit so that searching along a single orbit requires acquisition of only one of the four known codes associated with these satellites, and at least one of these four GPS satellites is not visible at a particular observation time. After acquisition of whatever GPS satellites on a particular GPS orbit can be tracked, the system moves sequentially from one GPS orbit to another orbit until all trackable GPS satellites are found. The system then selects the three or four GPS satellites that are most suitable for global positioning computations.

These methods either require storage of detailed knowledge of the satellite trajectories or of satellite signal indicia. This information for SATPS satellites can be voluminous and is not present in many SATPS signal receiver/processor systems. What is needed is a method that relies only upon information that is already available within the receiving system or from another nearby receiving system. Preferably, the method should provide reasonably accurate information on the present location of any visible SATPS satellite, should allow rapid acquisition of SATPS signals from one or a plurality of visible SATPS satellites, and should not require consumption of much additional power for operation.

SUMMARY OF THE INVENTION

The invention focuses on initial acquisition and identification of visible SATPS satellites by an SATPS signal antenna and receiver/processor ("SATPS station") at the time of power-up. Receipt of differential SATPS signals from another already-operative SATPS station allows the SATPS station that is now powering up (the "new" SATPS station) to reduce the number of SATPS channels searched. The new SATPS Station need not store the SATPS almanac information and may use less expensive timing sources. This eliminates the need for a back-up battery and allows quicker acquisition of the visible SATPS satellites upon power-up.

In one embodiment, the method includes the steps of: (1) providing a reference SATPS station, whose location coordinates are known with high accuracy, with a transmitter to broadcast differential SATPS information to other nearby SATPS stations, including the new SATPS station; (2) providing differential SATPS information from the reference station to the new station, including the pseudorange corrections and satellite index of each SATPS satellite that is visible from the reference station (the SATPS "reference/visible" satellites); (3) establishing a selected number of channels at the new station to acquire SATPS signals from the reference/visible satellites; (4) stepping through the pseudorange and code-phase attributes for each of the visible SATPS satellites to acquire and lock onto the SATPS signals from one or more of the SATPS satellites; (5) once one SATPS satellite signal is acquired, narrowing the frequency tuning range of all the other tuning channels to a much smaller frequency range, based upon the calculated frequency error and Doppler shift frequency range; and (6) using this smaller frequency range to more quickly acquire and lock onto additional SATPS satellite signals, if needed.

Limiting the search for SATPS satellite signals at the new station to the visible SATPS satellites for which differential SATPS information is available provides the following benefits. First, a station that is not a reference station does not need battery backup for the random access memory in order to store the satellite almanac information. Second, as each SATPS satellite signal is acquired and identified, the frequency range that needs to be searched for that satellite can be narrowed substantially, using an estimate of the Doppler shift for signals emitted from that satellite. Third, an inexpensive time base source for an SATPS receiver/processor can be used without incurring a large penalty in satellite signal acquisition time. Once one satellite signal is locked onto, the SATPS receiver/processor can correct for the (relatively large) frequency error of the associated time base and can search over a smaller frequency range that covers the appropriate Doppler shifted frequencies received.

DESCRIPTION OF BEST MODE OF THE INVENTION

Figure 1:
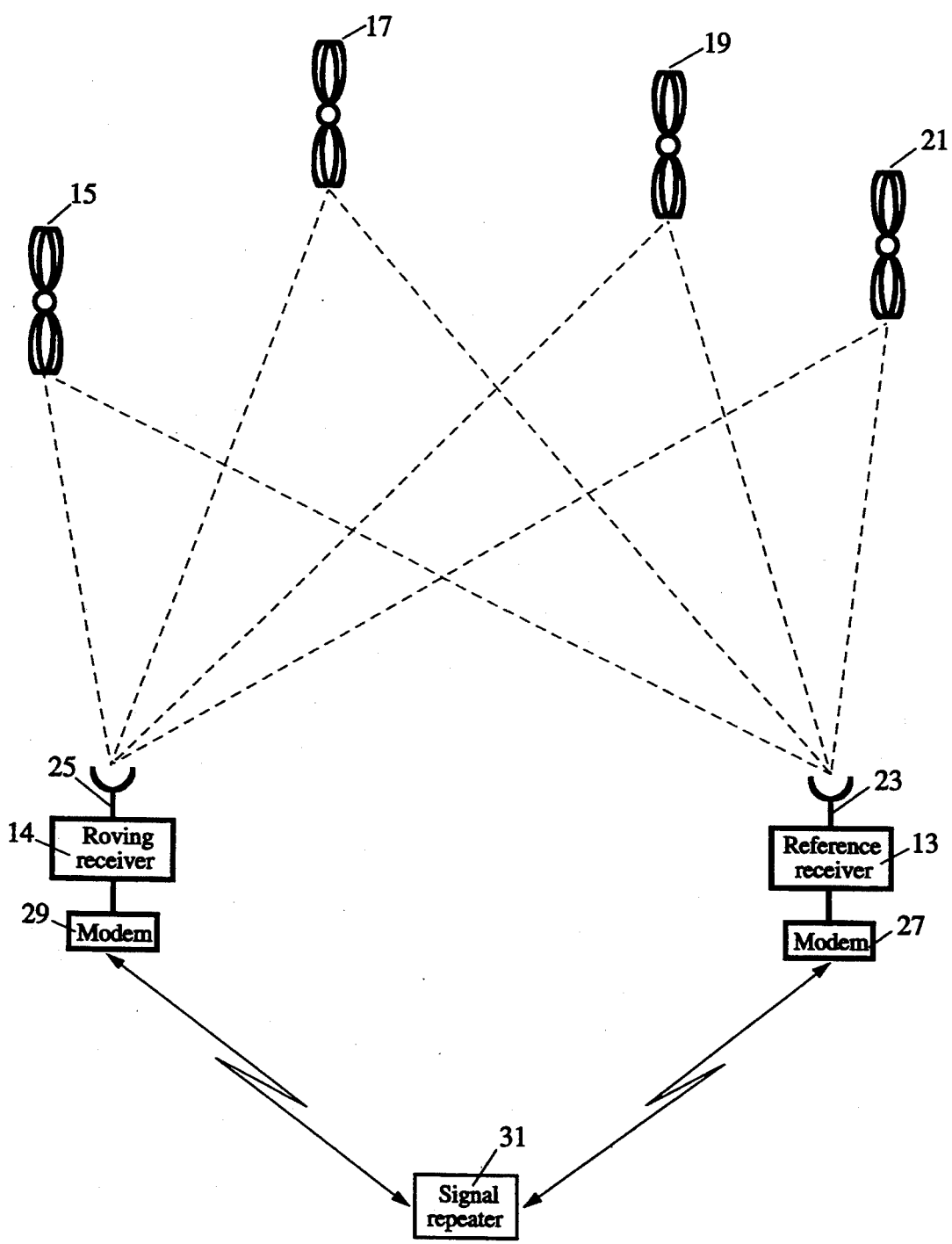
FIG. 1 is a schematic view of a differential satellite positioning system in operation, showing a reference SATPS station and another SATPS station that receives differential SATPS information from the reference station.

FIG. 1 illustrates operation of a differential satellite positioning system in simplified form. A reference station 13, including an SATPS receiver/processor and associated SATPS antenna 23, and a roving station 14, including an SATPS receiver/processor and associated SATPS antenna 25, are spaced apart on or adjacent to the Earth's surface, where it is assumed that the reference receiver's location is known very accurately at any time. Presently, an SATPS signal antenna is approximately omni-directional so that SATPS signals can be received from any area of the sky, except near the horizon, without "pointing" the antenna.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information, stored in the receiver/processor and from information on the ephemerides for each identified SATPS satellite. The SATPS signal antenna and signal receiver/processor arc part of the user segment of a particular SATPS, the Global Positioning System, as discussed by Tom Logsdon in *The NAVSTAR Global Positioning System*, Van Nostrand Reinhold, 1992, pp. 33–90, incorporated by reference herein.

The reference station 13 may be stationary or may be moving with location coordinates known as a function of time t. Four or more SATPS satellites 15, 17, 19 and 21 transmit SATPS signals that are received by the reference and roving stations 13 and 14 and converted to present location, velocity and time for that station. The reference and roving stations 13 and 14 also include modems 27 and 29, respectively, or other communication means that provide a one-way between the reference station 13 and the roving station 14 or a two-way link, as shown. Optionally, the system shown in FIG. 1 may also include one or more signal repeaters 31, located between the two stations 13 and 14, to facilitate long distance or non-line-of-sight communication between these two stations. Optionally, the system may include two or more roving stations.

Assume that a roving station 14 has lost its lock on one or more (or all) visible SATPS satellites 15, 17, 19 and 21, or that the roving station is powering up after a period of no activity. This roving station 14 (referred to herein as a "new" station for convenience) will need to acquire or reacquire, and to lock onto, one or more of the SATPS satellites visible from the reference station 13 (referred to as a "reference/visible satellite" herein for convenience), in order to provide location and/or time information for this new station. The reference station 13 may be moving or may be stationary. It is assumed that the reference station 13 is located nearby (i.e., within 250 kilometers) and that its location coordinates are known with high accuracy at any time so that differential satellite positioning system ("DSATPS") information is available from the reference station.

Figure 2:
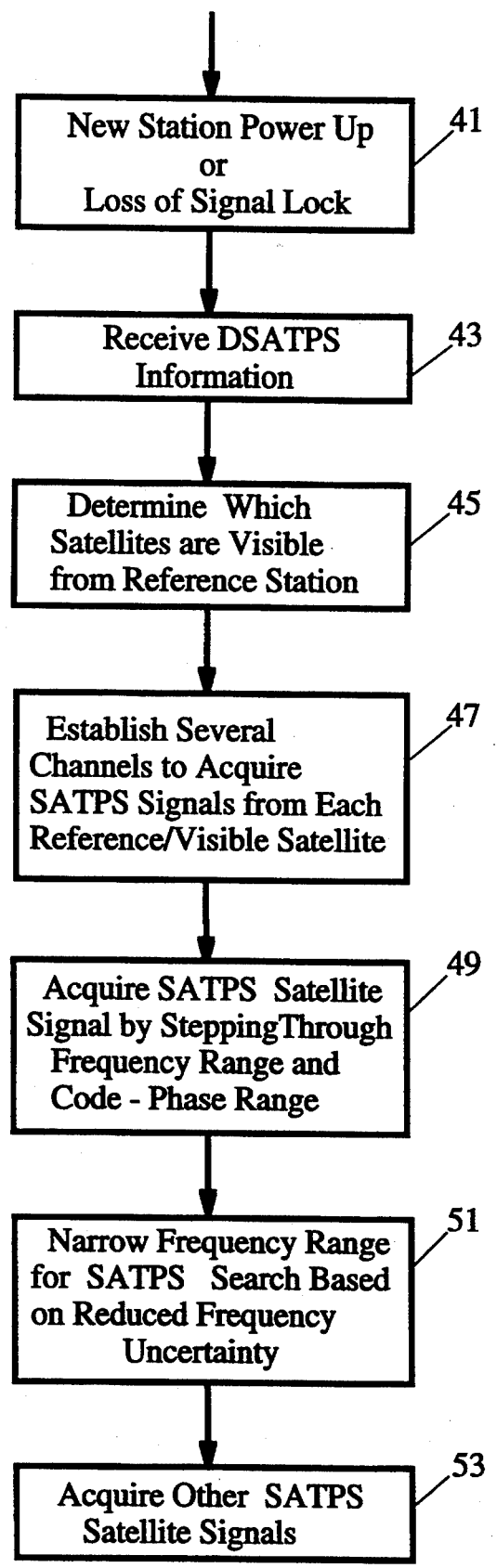
FIG. 2 is a flow chart illustrating acquisition of and lock-on for one or more SATPS satellites signals by a new SATPS station according to one embodiment of the invention.

According to one embodiment of the invention, this procedure for (re)acquisition and lock-on for one or more visible SATPS satellites is illustrated in FIG. 2. In step 41, the new station either powers up or senses that it has lost lock on all SATPS satellites. In steps 43 and 45, the new station 14 receives DSATPS information from the reference station 13 and determines the reference/visible SATPS satellites. In step 47, the new station 14 sets up a sufficient number of SATPS signal channels to receive SATPS signals directly from the reference/visible SATPS satellites. In step 49, the frequency range and code-phase attributes (PRN codes, etc.) are stepped through for each of these SATPS satellites to acquire and lock onto the SATPS signals from one or more of the SATPS satellites. This may be implemented by searching simultaneously over, say, six channels, each corresponding to a different reference/visible SATPS satellite. After a first SATPS satellite signal is acquired, the frequency tuning range for all the other reference/visible SATPS satellites is narrowed, in step 51, to a small frequency range around the calculated frequency, based upon Doppler shift frequency ranges given by the ephemeris data for that satellite. In step 53, additional SATPS satellite signals are acquired and locked onto, if needed.

Once an SATPS satellite is tracked and its SATPS signals are acquired and locked onto, the frequency range for the search can be narrowed, because an estimate can be made of the error of the roving station frequency source. Two sources of significant error in SATPS signal acquisition are (1) Doppler frequency shift due to the non-zero velocity of a satellite relative to an SATPS receiver/processor and (2) SATPS receiver/processor time base error relative to the more accurate satellite time base. Where a relatively inexpensive clock is used to provide a time base for an SATPS receiver/processor, the second of these two errors can be about ten times as large as the first error. For example, the maximum Doppler shift frequency may be 5–8 kHz, and the time base error may correspond to a frequency error of 47 kHz (30 ppm for a frequency of 1.575 GHz). Use of a relatively expensive and more accurate clock to provide a time base for the SATPS receiver/processor will reduce the time base error. Once an SATPS signal is locked onto and that satellite is identified, the receiver/processor time base error, which is approximately the same for any SATPS satellite, can be determined and the frequency range for subsequent searches for other SATPS satellites can be reduced to the Doppler shift frequency range, which is much smaller than the original frequency range that must be searched.

The system disclosed here allows rapid acquisition of SATPS satellite lock-on for any number of visible satellites. Acquisition of a first SATPS satellite, using a conventional search approach, may require a time interval of several minutes. The search approach disclosed here allows acquisition of a first SATPS satellite in reduced time, relative to the time required for a conventional search, depending on the number of satellite acquisition channels used.

Further, the clock used to provide a time base for the SATPS receiver/processor at the roving station may be much less precise using the disclosed system for satellite acquisition. For example, a receiver clock that is accurate to within 2.5 ppm or lower, with a representative cost of the order of $25, is often required for reasonably prompt SATPS satellite acquisition in a conventional setting. A receiver clock that is accurate to within 10 ppm, with a representative cost of about $5, will suffice for the system disclosed here; and it is possible that a clock that is merely accurate to within 20 ppm can be used with the disclosed system, which would reduce the cost of the clock further.

Finally, the new station need not store the SATPS satellite ephemeride information itself. The new station can call up and make use of this information from the reference station when the new station is operated, and thus use smaller permanent memory for general operations.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiples $f1=1540\ f0$ and $f2=1200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\alpha f^{-2}$). This phenomenon is discussed by MacDoran in U.S. Pat. No. 4,463,357, which discussion is incorporated by reference herein. When transit time delay through the ionosphere is determined, a phase delay associated with a given carder signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of $10\ f0 = 10.23$ MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 September 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246\ 30\ 7k/16)$ GHz, where $k$ ($=0, 1, 2, \ldots, 23$) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters in some circumstances.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

I claim:

1. A method for rapid acquisition of one or more Satellite Positioning System (SATPS) satellite signals by an SATPS station, referred to as a new SATPS station, that seeks to acquire or to reacquire such SATPS signals, the method comprising the steps of:
   (1) providing a reference SATPS station, whose location coordinates are known with high accuracy, with a transmitter to broadcast differential SATPS information to other nearby SATPS stations, including the new SATPS station;
   (2) providing differential SATPS information from the reference station to the new station, including satellite number or equivalent satellite indicia, for each SATPS satellite that is visible from the reference station, referred to as an SATPS reference/visible satellite;
   (3) establishing a selected number of channels to acquire SATPS signals from each of the SATPS reference/visible satellites;
   (4) stepping through the frequency range and code-phase attributes for each of the SATPS reference/visible satellites to acquire and lock onto the SATPS signals;
   (5) after a first SATPS satellite signal is acquired, reducing the frequency tuning range to a smaller frequency range, based upon that satellite's expected Doppler shift frequency range; and
   (6) using this smaller frequency range to search for and acquire an SATPS signal from at least one additional SATPS satellite.

2. The method of claim 1, further comprising the step of choosing said Satellite Positioning System to be a Global Positioning System or a Global Orbiting Navigation Satellite System.

3. A method for acquisition of one or more SATPS satellite signals by an SATPS station, referred to as a new SATPS station, that seeks to acquire or to reacquire such SATPS signals, without requiring storage of SATPS satellite ephemeride information at the new station, the method comprising the steps of:
   (1) providing a reference SATPS station, whose location coordinates are known with high accuracy, with a transmitter to broadcast differential SATPS information to other nearby SATPS stations, including the new SATPS station;
   (2) providing differential SATPS information from the reference station to the new station, including satellite number or equivalent satellite indicia, for each SATPS satellite that is visible from the reference station, referred to as an SATPS reference/visible satellite, and information on the ephemeride for each SATPS reference/visible satellite;

(3) establishing a selected number of channels to acquire SATPS signals from each of the SATPS reference/visible satellites;

(4) stepping through the frequency range and code-phase attributes for each of the SATPS reference/visible satellites to acquire and lock onto the SATPS signals;

(5) after a first SATPS satellite signal is acquired, reducing the frequency tuning range to a smaller frequency range, based upon that satellite's expected Doppler shift frequency range; and (6) using this smaller frequency range to search for and acquire an SATPS signal from at least one additional SATPS satellite.

4. The method of claim 3, further comprising the step of choosing said Satellite Positioning System to be a Global Positioning System or a Global Orbiting Navigation Satellite System.

5. A method for rapid acquisition of one or more SATPS satellite signals by an SATPS station referred to as a new SATPS station, that seeks to acquire or to reacquire such SATPS signals, the method comprising the steps of:

(1) providing a reference SATPS station, whose location coordinates are known with high accuracy, with a transmitter to broadcast differential SATPS information to other nearby SATPS stations, including the new SATPS station;

(2) providing differential SATPS information from the reference station to the new station, including satellite identifying number or equivalent indicia, for each SATPS satellite that is visible from the reference station, referred to as an SATPS reference/visible satellite, where the reference station and the new station each have a timing source and the new station timing source has an associated inaccuracy of as high as 20 parts per million;

(3) establishing a selected number of channels to acquire SATPS signals from each of the SATPS reference/visible satellites;

(4) stepping through the frequency range and code-phase attributes for each of the SATPS reference/visible satellites to acquire and lock onto the SATPS signals;

(5) after a first SATPS satellite signal is acquired, reducing the frequency tuning range to a smaller frequency range, based upon that satellite's expected Doppler shift frequency range; and (6) using this smaller frequency range to search for and acquire an SATPS signal from at least one additional SATPS satellite.

6. The method of claim 5, further comprising the step of choosing said Satellite Positioning System to be a Global Positioning System or a Global Orbiting Navigation Satellite System.

* * * * *